(12) United States Patent
Neuse

(10) Patent No.: US 8,296,426 B2
(45) Date of Patent: Oct. 23, 2012

(54) SYSTEM AND METHOD FOR PERFORMING CAPACITY PLANNING FOR ENTERPRISE APPLICATIONS

(75) Inventor: Douglas M. Neuse, Austin, TX (US)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 13/068,189

(22) Filed: May 3, 2011

(65) Prior Publication Data

US 2011/0213880 A1    Sep. 1, 2011

Related U.S. Application Data

(63) Continuation of application No. 11/168,628, filed on Jun. 28, 2005, now Pat. No. 8,200,805.

(60) Provisional application No. 60/583,804, filed on Jun. 28, 2004.

(51) Int. Cl.
*G06F 15/173* (2006.01)
(52) U.S. Cl. ......................... 709/224; 709/223
(58) Field of Classification Search .................. 709/224, 709/223
See application file for complete search history.

(56) References Cited

U.S. PATENT DOCUMENTS

| | | |
|---|---|---|
| 5,475,844 A | 12/1995 | Shiramizu et al. |
| 6,067,412 A | 5/2000 | Blake et al. |
| 6,144,893 A | 11/2000 | Van Der Vegt et al. |
| 6,341,240 B1 | 1/2002 | Bermon et al. |
| 6,415,260 B1 | 7/2002 | Yang et al. |
| 6,457,143 B1 | 9/2002 | Yue |
| 6,564,113 B1 | 5/2003 | Barto et al. |
| 6,738,736 B1 | 5/2004 | Bond |
| 6,986,139 B1* | 1/2006 | Kubo ............................ 718/105 |
| 7,062,556 B1* | 6/2006 | Chen et al. .................... 709/226 |
| 7,116,639 B1 | 10/2006 | Gail et al. |
| 2002/0099521 A1 | 7/2002 | Yang et al. |
| 2003/0033182 A1 | 2/2003 | Stok et al. |
| 2004/0111508 A1* | 6/2004 | Dias et al. ..................... 709/224 |
| 2004/0111509 A1* | 6/2004 | Eilam et al. ................... 709/224 |
| 2004/0136379 A1 | 7/2004 | Liao et al. |
| 2004/0139191 A1* | 7/2004 | Chambliss et al. ........... 709/224 |
| 2005/0278439 A1 | 12/2005 | Cherkasova |

* cited by examiner

*Primary Examiner* — Larry Donaghue
*Assistant Examiner* — Nicholas Taylor
(74) *Attorney, Agent, or Firm* — Schultz & Associates, P.C.

(57) ABSTRACT

A system and method for capacity planning for enterprise networks, such as identifying bottlenecks and removing or replacing the bottleneck device are provided. The device utilization for one or more network devices are measured or read from measured data. A relative load is calculated from the device utilization data and device utilization is compared to a device threshold to determine the bottleneck device. A method is also provided for determining network utilizations, network populations and a relative response times based on only limited measurable device usage data.

21 Claims, 8 Drawing Sheets

| network usage data for configuration 'I' | device 1 | device 2 | ... | device e | ... | device D | relative load | measured network response |
|---|---|---|---|---|---|---|---|---|
| data set 1 | $\rho_{11}$ | $\rho_{21}$ | ... | $\rho_{e1}$ | ... | $\rho_{D1}$ | $<x_1> = 1$ | $<R_0>_1$ |
| data set 2 | $\rho_{12}$ | $\rho_{22}$ | ... | $\rho_{e2}$ | ... | $\rho_{D2}$ | $<x_2>$ | $<R_0>_2$ |
| data set 3 | $\rho_{13}$ | $\rho_{23}$ | ... | $\rho_{e3}$ | ... | $\rho_{D3}$ | $<x_3>$ | $<R_0>_3$ |
| . | . | . | . | . | . | . | . | . |
| . | . | . | . | . | . | . | . | . |
| data set I | $\rho_{1I}$ | $\rho_{2I}$ | ... | $\rho_{eI}$ | ... | $\rho_{DI}$ | $<x_I>$ | $<R_0>_I$ |

SYSTEM AND METHOD FOR PERFORMING CAPACITY PLANNING FOR ENTERPRISE APPLICATIONS

CROSS-REFERENCE TO RELATED APPLICATIONS

This application is a Continuation claiming priority benefit from U.S. patent application Ser. No. 11/168,628, filed Jun. 28, 2005 now U.S. Pat. No. 8,200,805 entitled "System And Method For Performing Capacity Planning For Enterprise Applications" which claims benefit from U.S. Provisional Application No. 60/583,804 filed Jun. 28, 2004.

BACKGROUND OF THE INVENTION

In order to maintain and improve good end user performance, application and system managers must understand the current performance of their applications, be able to identify and predict current and future performance problems, and evaluate potential solutions to those problems. Data such as utilizations by device, especially at major servers can be easily collected by an enterprise-wide resource monitor or other monitors. But much of the system data necessary to predict bottlenecks are not easily measurable or in some cases are not measurable at all. In this situation, these utilizations must be calculated.

Generally, utilizations increase roughly linearly with load. Other enterprise wide factors such as response times also increase with the load of the system, but these increases do so non-linearly. Since a response time in the network may become unacceptable before utilizations and vice versa, a need exists to determine a bottleneck device in the network and to change the configuration of the network to remove or replace the bottleneck device.

One commonly used network is a network of M/M/1 queues. A single M/M/1 queue is made of a Poisson arrival process, a First In First Out (FIFO) queue of unlimited capacity and a server with exponentially distributed service time. An M/M/1 queue has a traffic rate or utilization $\rho$. The value of $\rho$ shows how "busy" that device or server is. The network (of M/M/1 queues) is also described by certain parameters: the rate of arrivals to the network, the visit ratio for each device (the average number of times that each request arriving to the network visits that device), and the average service time at each device. These network parameters are used to compute the utilization, the mean number of jobs in the network, and the mean network response time for the purposes of predicting bottlenecks. However, when these parameter values are not measurable, the utilization, mean number of jobs in the network, mean network response time, and bottlenecks cannot be predicted.

The prior art discloses method and apparatus for allocation of resource in a United States Publication to Liao et. al. US2004/0136379A1 and a system and method for evaluating resource utilization to Shiramizu et al. U.S. Pat. No. 5,475,844. However, the prior art does not address all of the concerns presented herein.

A need exists for a method to predict these network usage data, and identify bottlenecks from limited measurable inputs such as individual device utilizations. Also useful is the ability of a method to measure or estimate network response times by business function.

SUMMARY OF THE INVENTION

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

It is an object of the present invention to provide a system and method for performing capacity planning for enterprise networks capable of calculating device utilization, network population, a mean response time of the network, to identify device bottlenecks and to prescribe an upgrade process.

In accordance with one aspect of the present invention, a system is provided for capacity planning by a means of reading and storing device utilization data for one or more network devices, a means for calculating a utilization ratio from the read device utilization data, and a means to predict a bottleneck device by comparing a utilization threshold and the device utilization at the relative load.

In accordance with another aspect of the invention, a method is provided for capacity planning of an enterprise network which includes the steps of measuring device utilization data for a subset of network devices and identifying a bottleneck device from the set of network devices using the measured utilization data.

In accordance with an additional aspect of the present invention, a method is provided for capacity planning of an enterprise network where only limited device usage data are measurable which includes the steps of identifying a subset of busiest network devices from the set of network devices, measuring device utilizations for the subset of busiest network devices, and estimating a network population ratio increase from the measured device utilizations.

In another aspect of the present invention a method is provided for determining capacity parameters for a network including a set of network devices and operating with a given base load which includes the steps of providing a measured device utilization at the base load, calculating a network arrival rate from the measured device utilization, calculating device utilization at a relative load value and calculating relative load network population at a relative load value.

Another aspect of the present invention teaches a method for performing a capacity upgrade on a given network which includes the steps of normalizing stored network device speeds associated with network devices in the given network to a constant value, replacing one or more network devices in the given network with one or more new network devices, calculating relative speeds for the one or more new network devices, and predicting network device utilizations for network devices in the upgraded network for one or more relative load values.

A method for determining network response times within the process of performing network capacity planning for a given network is another aspect of the present invention, the method including the steps of obtaining network usage data and calculating relative network response times at one or more relative load values based on the network usage data.

DETAILED DESCRIPTION OF EXEMPLARY EMBODIMENTS

The present invention is described to a large extent in this specification in terms of systems and methods for performing capacity planning for enterprise applications. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention. The invention also may be embodied in a computer program product, such as a diskette or other recording medium, for use with any suitable data processing system. Embodiments of a computer program product may be implemented by use of any recording medium for machine-readable information. Although most of the exemplary embodiments described in this specification are oriented to software installed and executing on computer hardware, alternative embodiments may be implemented as firmware or as hardware and are within the scope of the present invention.

The present invention can accommodate all device types including any input and output device and can also be extended to apply for each application on the system or network of interest. Although calculations for the present invention are based on a network of M/M/1 queues, they may also be applied to other types of network queues.

Figure 1:
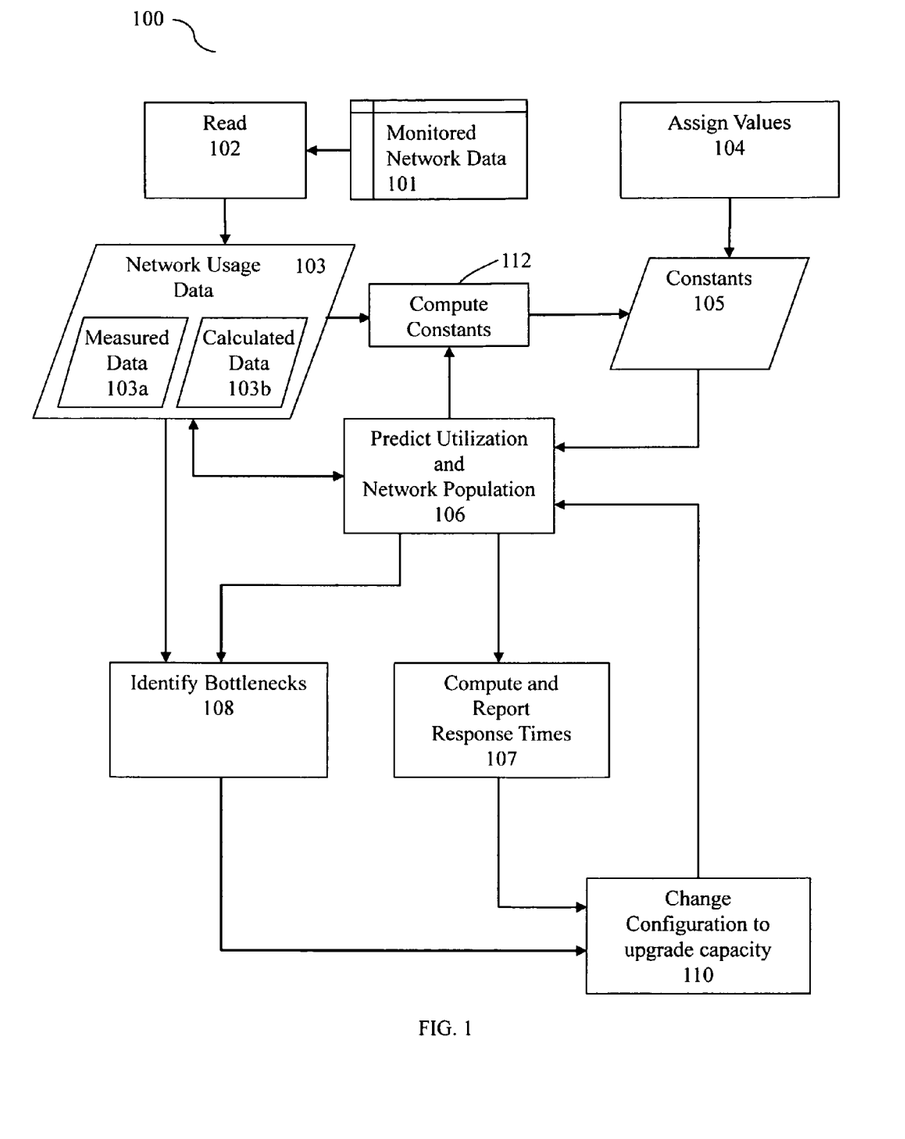
FIG. 1 is a diagram an exemplary method to utilize network data for capacity planning within the preferred embodiment of the present invention.

Turning to FIG. 1, disclosed is an exemplary method of the present invention to perform capacity planning. Method 100 of FIG. 1 includes the step 102 of reading from monitored network data 101 some measured network usage data 103a. Monitored network data, gathered from system performance monitors, may be stored in a raw file or a file such as a resource standard file which contains tables of the device name and usage data for each device. The measured network usage data 103a is stored within network usage data 103 and includes but is not limited to data such as the utilizations of devices at the base load and original configuration, response times, service times, visit ratios, and job rates. An example of a system performance monitor is the Unix System Activity Report (SAR) provided with Unix and Linux systems. Numerous other examples of commercial performance monitors, well known in the art, work in cooperation with the present invention.

Network usage data 103 also includes calculated network usage data 103b comprised of usage data that is generated as output of other steps included in method 100 and augments the measured network usage data 103a in useful predictive ways to be explained herein.

The method 100 also includes the step 104 of assigning values to constants 105 for further use in calculation of the method. The constants 105 to which the values are assigned include, but are not limited to, the configuration 'c', device speeds '$b_d(c)$', and certain network response time model coefficients: $a_0$, $a_1$, and $a_2$. The coefficients $a_0$, $a_1$, and $a_2$ may also be computed from network usage data 103 using a process 112 to perform a curve fitting function for predicting response times. Step 112 is performed later in the method 100 if network usage data 103 requires augmentation of calculated network usage data 103b to make network usage data 103 sufficient for input to step 112. Since the order of carrying out steps 102 and 104 are not fixed, either step may be performed first.

For reference purpose, 'c' is used to represent the configuration. 'c' is incremented each time the configuration is changed. For example, for the initial configuration, the value 'c' is set to 1, a change in the initial configuration results in an increment in the value of 'c', so replacing a bottleneck device from the initial configuration with a new device increments 'c'=1, to 'c'=2. Likewise, $b_d(c)$ which is the speed of device 'd' in configuration 'c' will also be assigned the value of '1' for the base configuration and incremented for each new configuration.

The method of FIG. 1 includes the step 106 of predicting device utilizations and network population at relative loads with respect to the base load. The relative load being a measure of network activity, i.e. the relative rate at which job requests arrive to the network compared to the rate at which job requests arrive to the network at base load. The calculated relative load device utilizations and relative load network populations are stored with calculated network usage data 103b and used in step 107 to compute and report the network response times. Embodiments of step 106 will be described in detail in relation to FIGS. 2 and 3 and of step 107 in FIGS. 4 and 5.

Bottleneck devices are identified in step 108, for the base load state using information from the measured network usage data 103a and predicatively for higher relative loads using the calculated network usage data 103b from step 106. The method of step 108 for identifying bottleneck devices is described further in FIG. 6.

The configuration of the network is changed in step 110 to remove and upgrade the bottleneck devices. Bottleneck information from step 108 in combination with response time information from step 107 are used to make decisions regarding the network configuration; decisions such as when to upgrade and which devices to upgrade first are clearly aided by the methodology 100. The exemplary method 100 illustrated in FIG. 1 may be repeated as shown to prevent future bottlenecks and tune the network response time.

Various methods corresponding to step 106 for predicting device utilization and network population and step 107 for calculating response times are described below. However the methods employed in a given situation differ depending on the character of the device usage data available is network usage data 103.

For example, in step 106, device utilization is represented by $\rho_d$ and may be calculated by:

$$\rho_d = \lambda_0 v_d s_d$$

where $\lambda_0$ is the arrival rate of jobs to the network, $v_d$ is the average number of times each job visits device d and $s_d$ is the average service time at device d. If $\lambda_0$, $v_d$, $s_d$ are available in network usage data 103, but $\rho_d$ is not, then $\rho_d$ is calculated for a given set of network loads that may exist in the data set. However, if there are no available measurements for either $\lambda_0$, $\lambda_d$ and $s_d$, but the individual device utilizations $\rho_d$ are measurable for a given network load, then $\rho_d$ can be calculated for other network loads as described in the following.

Figure 2:
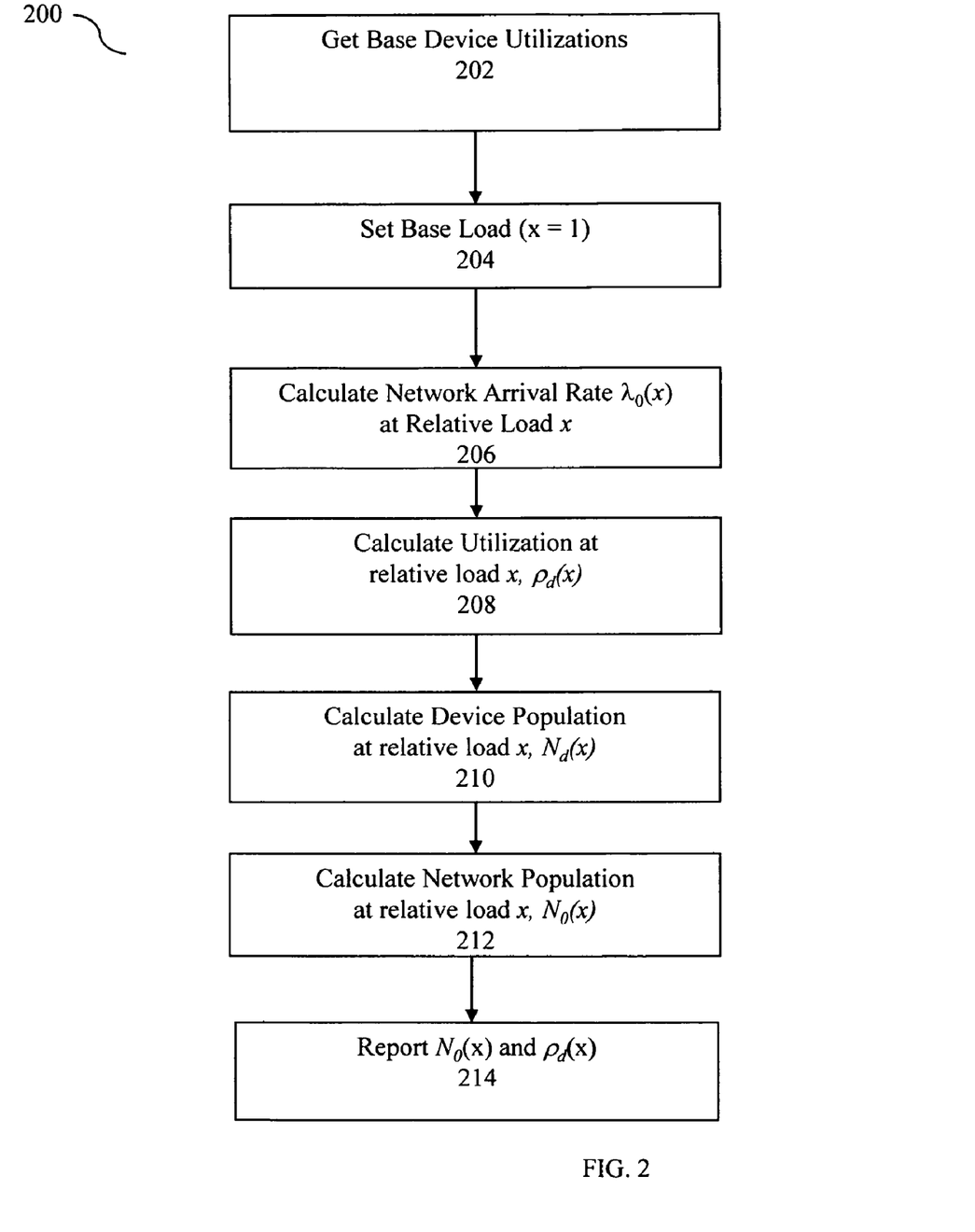
FIG. 2 is a diagram illustrating a first exemplary method of the present invention for predicting device utilizations and network populations.

In FIG. 2, illustrated is a flow chart of a first exemplary method 200 of the present invention to perform step 106 of method 100. The objective of method 200 is to predict relative load device utilizations and relative load network populations in the presence of device utilization measurements for a given base load on a given network configuration.

It is assumed that for a single base load, device utilizations are measured by system performance monitors as in step 101 and gathered into network usage data 103. Method 200 begins with the step 202 of obtaining representative network data from network usage data 103—which may contain other historical usage data, but not of interest for the present calculations. Using the variable 'x' to represent relative load, a value of 1 is assigned to 'x' to set the base load in step 204 wherein the base load usually refers to representative (e.g., recent average or peak period) measured demands on the network. Following step 204 of setting the base load, $\lambda_0(x)$, the network arrival rate at relative load 'x' is calculated in step 206 of method 200 by the equation:

$$\lambda_0(x) = x * \lambda_0(1)$$

wherein $\lambda_0(1)$, the base load network arrival rate, is a preset standard or is a measured value.

Once the network arrival rate at relative load 'x' is calculated, the method 200 of FIG. 2 proceeds to step 208 of calculating the utilization of device 'd' at relative load 'x', $\rho_d(x)$. $\rho_d(1)$, the utilization of the device at the base load, is measured and assumed to be available for all devices 'd'. The calculation of $\rho_d(x)$ proceeds as:

$$\rho_d(x) = x * \rho_d(1).$$

This equation is an estimation based under the assumption that device utilizations increase linearly with load.

After the step 208 of calculating the utilization at relative load 'x', the result $\rho_d(x)$ is used in steps 210 and 212 of calculating the mean number of jobs (or requests) for the network. In step 210, the mean number of jobs (or requests) for device 'd' at relative load 'x', $N_d(x)$ is computed. $N_d(x)$ is also referred to as the relative load device population and is defined by the equation:

$$N_d(x) = \rho_d(x)/(1 - \rho_d(x)).$$

After calculating $N_d(x)$, then $N_0(x)$, the mean number of jobs (or requests) in the network at relative load 'x' is computed in step 212. $N_0(x)$ is also referred to as the relative load network population which is found by a summation of the mean number of jobs or requests for each device in the network given by the equation:

$$N_0(x) = \sum_{d=1,D} N_d(x).$$

The main results of method 200 are reported by step 214: the relative load device utilization $\rho_d(x)$ and the relative load network population $N_0(x)$ which are useful for predicting network characteristics at network loads 'x' for the given configuration.

Figure 3:
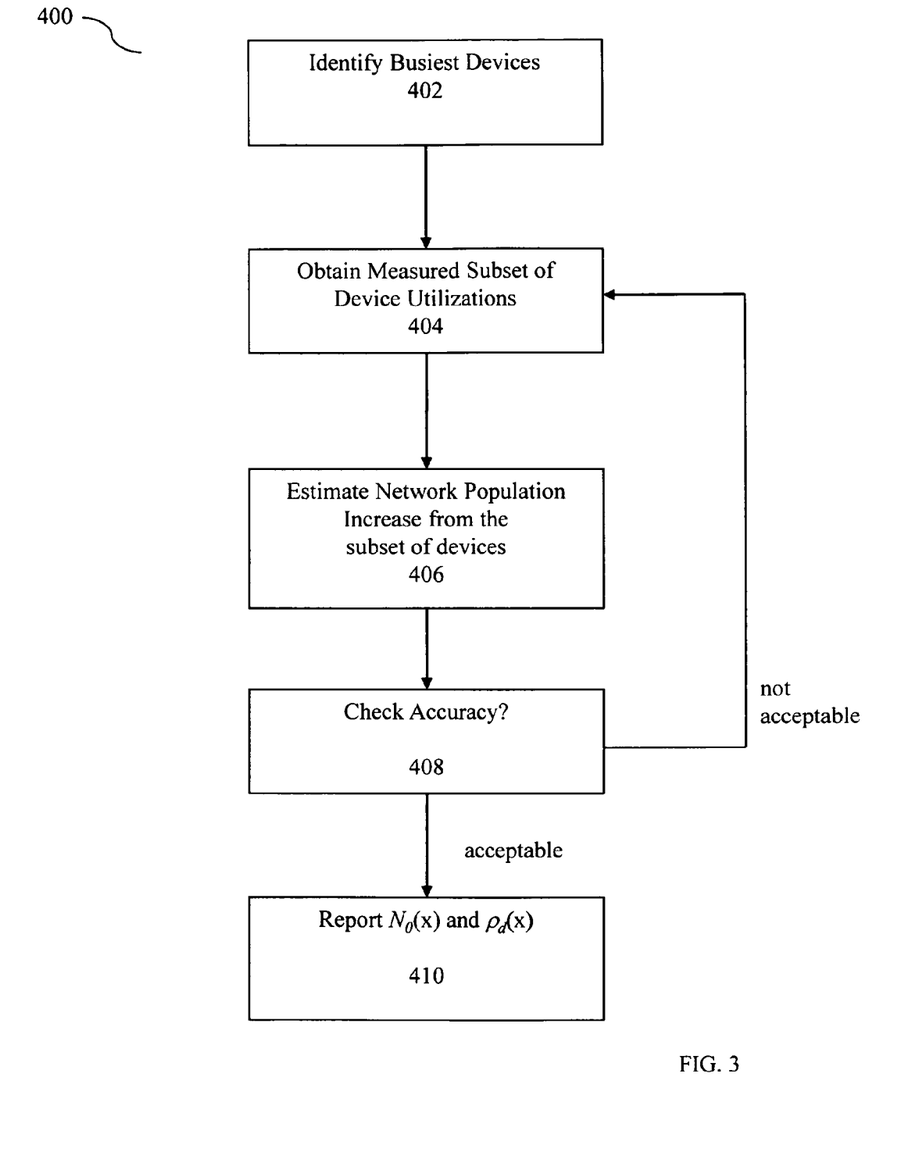
FIG. 3 is a diagram illustrating a second exemplary method of the present invention for predicting device utilizations and network populations using the busiest network devices.

In FIG. 3, illustrated is a flow chart of a second exemplary method 400 of the present invention to perform step 106 of method 100. As in method 200, the objective of method 400 is to estimate relative load device utilizations and relative load network populations in the presence of a limited number of device utilization measurements for a given base load on a given network configuration only. However, method 400 employs the further restriction that only the data for the busiest network devices will be used in the calculation. The method 400 does not provide an exact answer, but rather a very close estimation. The validity of the estimation is due to the fact that as the load increases, most of the increase in queuing occurs at the busiest devices.

The method 400 includes the first step 402 of identifying the busiest devices and then proceeds to step 404 of obtaining a subset of device utilization measurements from previously measured network usage data 103a. In another embodiment of the present invention, method 400 is accomplished by making immediate measurements of the busiest device utilizations and importing them directly into the method instead of using the measured network usage data 103. Although any subset of device utilizations may be measured and the busiest devices do not necessarily need to be identified first, in a preferred embodiment the measured subset of device utilizations in step 404 contains some or all of the busiest device measurements. Current device utilizations in step 404 are measured by system performance monitors as described previously.

Step 406 of method 400 estimates the increase in relative load network population for 'x' larger than '1' using the subset 'S' of devices 'd' in the equation:

$$N_0(x) = \sum_{d=1,S} N_d(x) = \sum_{d=1,S} \rho_d(x)/[1 - \rho_d(x)]$$

For example, suppose a network has 20 devices with utilizations $\rho_d(1) = 0.45^d$. Therefore $\rho_1 = 0.45$, $\rho_2 = 0.45^2 = 0.2005$ and so on. Assume the load is doubled so that x=2. The network population is given by solving:

$$N_0(x=2) = \sum_{d=1,20} N_d(2) = \sum_{d=1,20} \rho_d(2)/[1 - \rho_d(2)]$$

and $$\rho_d(2) = 2 \cdot \rho_d(1) = 2 \cdot (0.45)^d$$

Using the formula just given, and using all devices (S=20) in the calculation, the calculated relative load network population will increase from about 1.25 at x=1 to 10.06 at x=2, a ratio of approximately 8.055. However, the ratio can also be estimated by using only a subset of all of the devices in the calculation. If the three busiest devices are calculated (S=3) and summed together, the estimated network population will indicate an increase from about 1.17 to nearly 9.9, a ratio of 8.45. If the number of measurable subset devices were increased to ten (S=10) devices, the estimated ratio so obtained becomes 8.057 which is very close to the calculated ratio 8.055 when using all device utilization measurements (S=20).

The method of FIG. 3 also includes verifying accuracy in step 408. Verifying accuracy 408 is carried out by checking the number of devices used in the subset and by checking whether the busiest device utilization measurements were taken. A modest sized subset combined with the busiest device utilization should produce reasonably accurate predictions of relative response times. A device may be added or subtracted from the calculation at step 408 to understand the sensitivity of the result. If accuracy is not acceptable then another subset of devices is chosen to perform the method

400. If accuracy is acceptable then the estimated relative load network population $N_0(x)$ and device utilizations $\rho_d(x)$ are reported in step 410.

Figure 4:
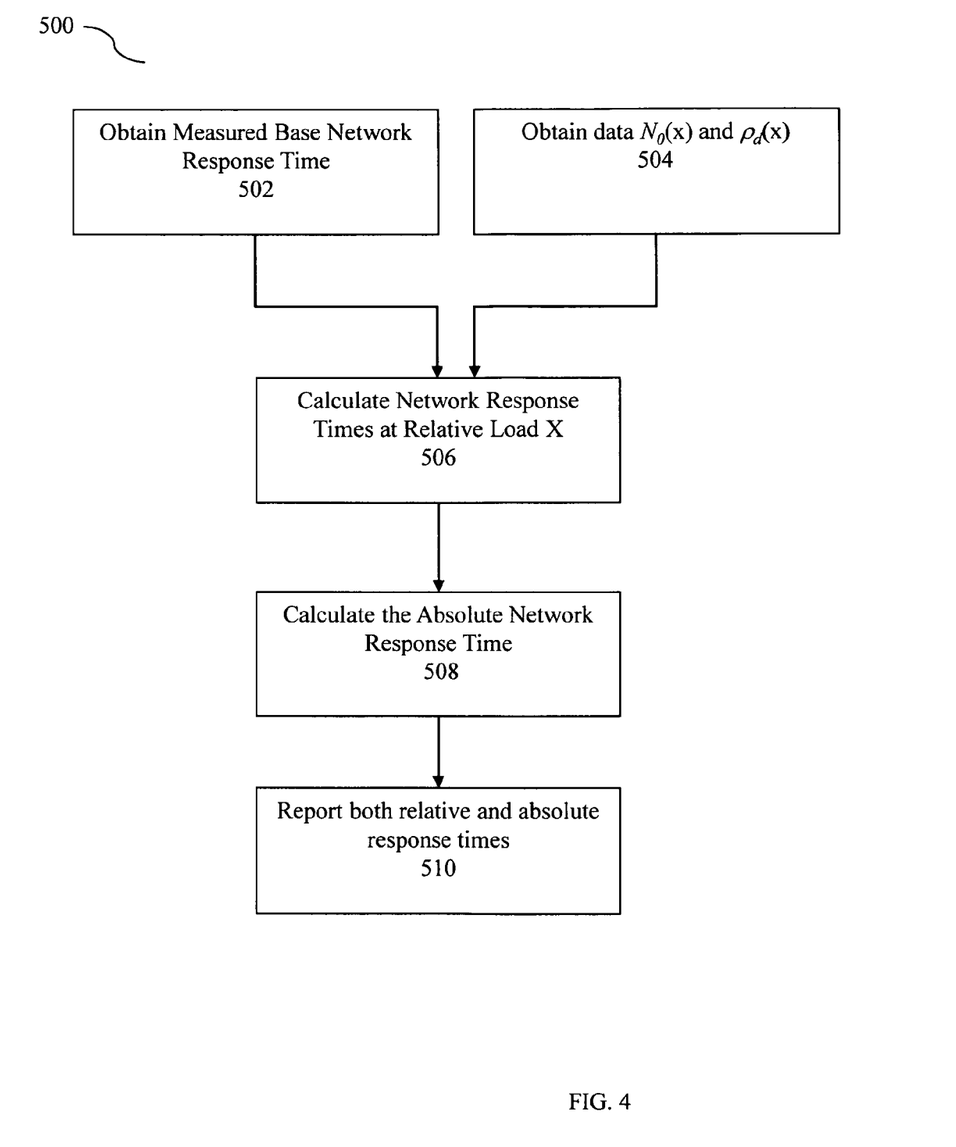
FIG. 4 is a diagram illustrating an exemplary method of the present invention for calculating relative and absolute network response times.

In the method 100 of FIG. 1, the Step 107 of computing and reporting response times is included. In FIG. 4 is a flow chart of exemplary method 500 to accomplish step 107. Types of calculated response times include a relative response time '$R_0(x)$' which is the relative mean network response time at relative load 'x' and when available, an absolute response time '$A_0(x)$' which is the absolute response time corresponding to $R_0(x)$. Response time is the time required for a given function to complete within an enterprise software application running on a given network.

The exemplary method 500 of FIG. 4 includes the options of either the step 502 of measuring directly or the step 504 of estimating the relative network response time at the base load, $R_0(1)$. $A_0(1)$ is the measured or estimated absolute network response time at the base load of x=1. The method 500 also includes step 506 of calculating the relative network response time at loads 'x', $R_0(x)$, the result of which is used in step 508 to calculate the absolute network response time, $A_0(x)$. Step 510 simply reports the response time results.

Step 502 to obtain the measured absolute response time is carried out by launching an application on the system and using system monitoring tools or application logs to measure the time it takes for the application to complete. Alternatively, base response times may be obtained from the measured network usage data 103a if the response times were measured previously. The absolute response time $A_0(1)$ may be used to scale the relative response time $R_0(x)$ to an absolute value $A_0(x)$ as described for step 508 below.

In step 504 the network parameters $N_0(x)$ and $\rho_d(x)$ calculated from network usage data 103 are provided as previously described by method 200 or method 400.

Relative network response time at loads 'x' other than the base load, $R_0(x)$, are computed in step 506 as follows. The mean network response time is assigned the value $R_0(1)=1$ at the base load, x=1, and the following useful equations result, $$\lambda_0(1)=N_0(1)/R_0(1)=N_0(1),$$

and $$\lambda_0(x)=x*N_0(1).$$

$R_0(x)$ is computed as:

$$R_0(x)=N_0(x)/\lambda_0(x)=(N_0(x)/N_0(1))/x,$$

where the $N_0(x)$ is given in step 504. The relative load response time calculation depends on accurately estimating the ratio of the network populations of the relative load and the base load given by $N_0(x)/N_0(1)$. Note that the relative load device utilizations $\rho_d(x)$ are useful for calculating $N_0(x)$ and thereby $R_0(x)$ for different values of the load 'x'.

As a continuation of the previous example given in relation to method 400 where the three busiest devices were used to compute $N_0(x)$ for x=2, $$R_0(x=2)=(N_0(2)/N_0(1))/2=8.045/2=4.022.$$

In step 508, $A_0(x)$ is calculated from $R_0(x)$ by the equation $$A_0(x)=R_0(x)*A_0(1).$$

Both the relative and absolute network response times are reported in step 510 by visual means or within network usage data 103 for bottleneck considerations.

In a situation when there are at least three device utilization measurement data sets and the mean network response time and the relative load is known for each set, a given function is fitted to the response time measurement data for a given set. This curve fitting process is used to compute mean response times $R_0(x)$ for arbitrary relative loads 'x'.

Figure 5A:
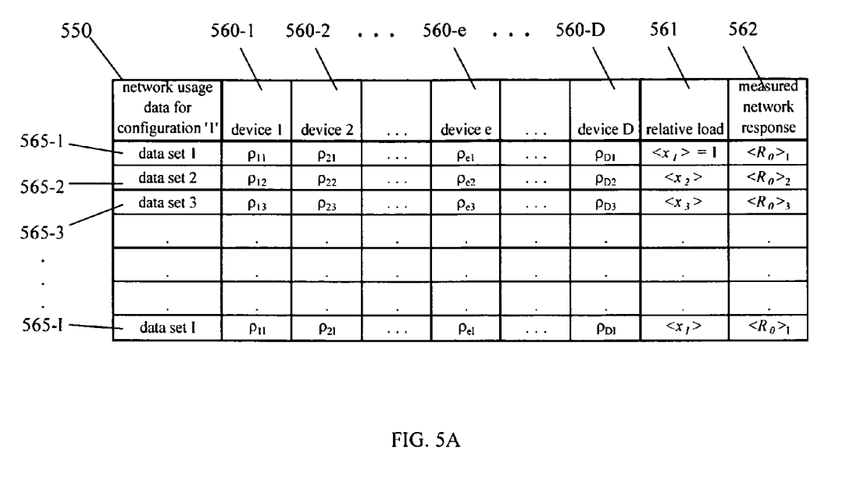
FIG. 5a is a drawing showing network usage data in the preferred embodiment of the present invention.

Refer to FIG. 5A. Over a period of time, the network usage data 103 are stored and organized into data sets as in the data matrix 550 with D columns and I rows and elements $\rho_{11}$, $\rho_{12}, \ldots \rho_{1I}$ in the first data column 560-1, elements $\rho_{21}$, $\rho_{22}, \ldots \rho_{2I}$ in the second data column 560-2, and so forth in each data column up to elements $\rho_{D1}, \rho_{D2}, \ldots \rho_{DI}$ in the last column 560-D. The columns represent utilization data for 'D' devices 'd' and the rows represent 'I' data sets 'i' so that the device utilization measurement $\rho_{di}$ is the utilization for device 'd' in data set 'i'. Associated with the data sets (rows 565-1, 565-2, ... 565-I in matrix 550) are their respective relative loads $<x_1>, \ldots, <x_i>$ in column 561 and their respective measured response times $<R_0>_1, \ldots, <R_0>_i$ in column 562. There must be at least three data sets available for the curve fitting process to work: if measured network usage data 103a has less than three data sets available, then one of the methods 200 or 400 in step 106 are employed to augment the network usage data 103 with calculated device utilizations (calculated network usage data 103b).

Figure 5B:
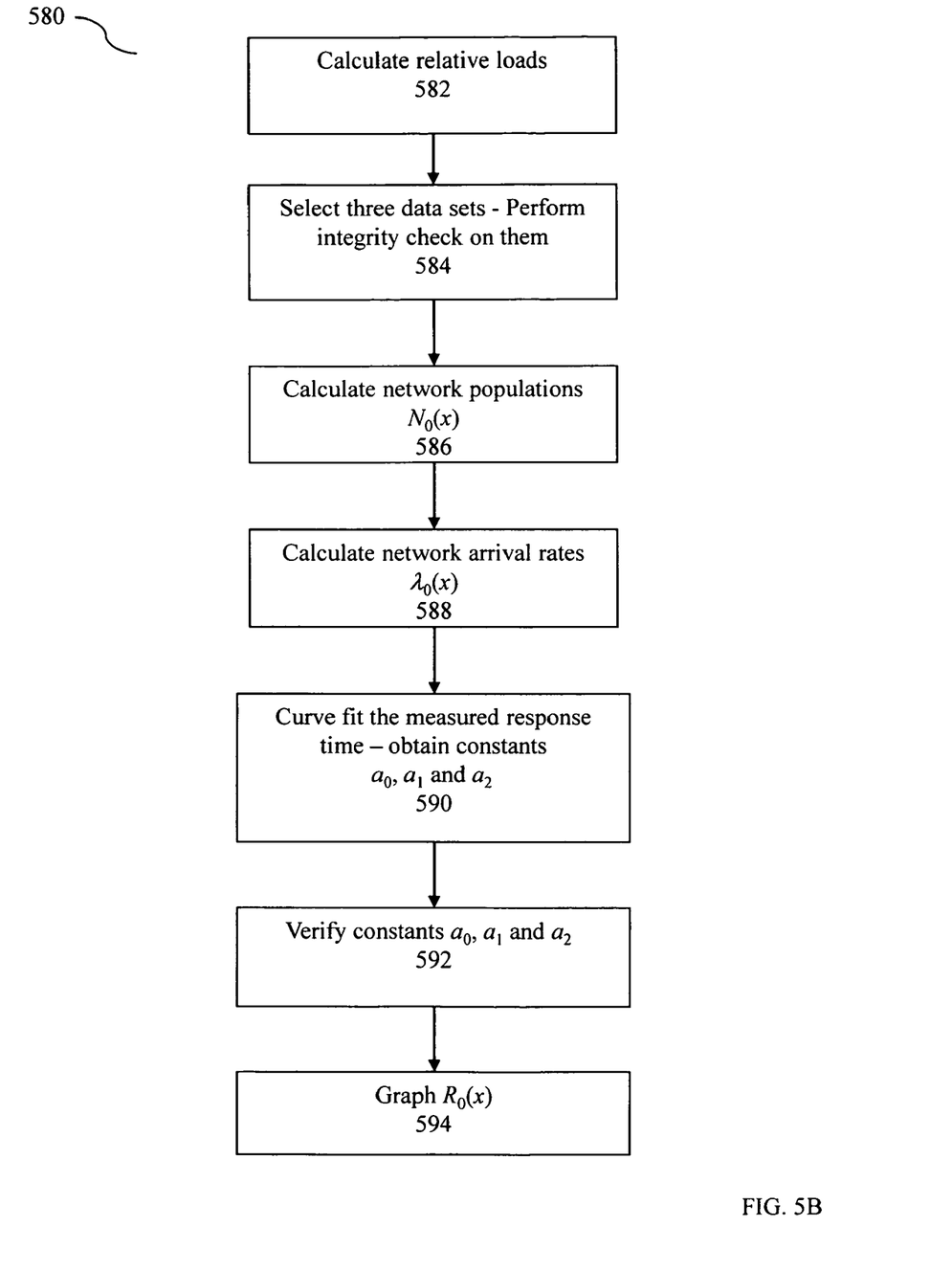
FIG. 5b is a diagram illustrating an exemplary method for performing a curve fit function for the network response time in the preferred embodiment of the present invention.

Referring now to the method 580 shown in FIG. 5B. The curve fitting process described by method 580 begins in step 582 of calculating relative loads $<x_i>$. One of the data sets 'i' from matrix 550 is chosen as the base set and assigned its load $<x_i>=1$; data set 1, row 1 is so chosen in the matrix 550. An arbitrary device 'e', with data in column 560-e, is selected and its relative loads are calculated by $<x_i>=\rho_{ei}/\rho_{e1}$ for each data set available. The relative load $<x_2>$ is then the ratio between the device utilization $(\rho_{e2})$ of device 'e' at the relative load $<x_2>$ and the device utilization $(\rho_{e1})$ of device 'e' at the base load and so on for the relative loads of the other data sets.

In step 584, three data sets are selected from the 'I' data sets, the base set and two others, and an integrity test is used in conjunction with the curve fitting. If $\rho_{di}/\rho_{dI}$ is not close to the calculated $<x_i>$ from step 582 (e.g., within an integrity threshold t1 percent of $<x_i>$) and $\rho_{di}$ is not small (e.g., below an integrity threshold t2) for some d and i, the data set will be rejected from the curve fitting equation and another data set is selected.

Once three data sets are selected for the curve fitting equation, the next step 586 is to calculate the network populations $N_0(x)$ which are calculated for $x=\{<x_1>, <x_2>, <x_3>\}$ using the equation:

$$N_0(x) = \sum_{d=1,D} N_d(x)$$

where $$N_d(x) = \rho_d(x)/[1-\rho_d(x)]$$

and $$\rho_d(x) = \rho_{di} \text{ for } i = \{1, 2, 3\}.$$

Also, the network arrival rates must be calculated. They are calculated in step 588 with the aid of equation:

$$\lambda_0(x)=x*\lambda_0(1) \text{ for } x=\{<x_2>, <x_3>\}$$

where $\lambda_0(1)=N_0(<x_1>)$
and $<x_1>$=base load=1

Method 580 proceeds to step 590 to curve fit the measured response time. The measured response times $<R_0>_i$, the calculated $N_0(x)$ and $\lambda_0(x)$ for $x=\{x_1, x_2, x_3\}$ are used in three equations in step 590 to solve for $a_0$, $a_1$, and $a_2$ in $$<R_0(x)>=a_0+a_1<x>+a_2[N_0(x)/\lambda_0(x)]$$

for $x=\{<x_1>, <x_2>, <x_3<\}$
using well-known methods in linear algebra for solving simultaneous equations.

After solving for $a_0$, $a_1$, and $a_2$, the three coefficients are verified in step 592. The standard theoretical equation projecting the mean response time $R_0(x)$ has coefficients $a_0=0$, $a_1=0$, and $a_2=1$. If the solved values of $a_0$, $a_1$, and $a_2$ are significantly different from these standard values, the calculations for the coefficients must be rechecked and possibly recalculated using different data sets. Finally, in step 594, the coefficients are substituted into the following equation and the equation is plotted as a function of the network populations and load:

$$R_0(x)=a_0+a_1x+a_2[N_0(x)/\lambda_0(x)]$$

where x is now a continuous variable and $\lambda_0(x)$ is related to the base network population by $$\lambda_0(x)=x*N_0(1)$$

assuming $R_0(1)=1$ for the base relative load x=1.

Referring back to FIG. 1, the constants $a_0$, $a_1$, and $a_2$ are imported into constants 105 in method 100. Method 580 excluding the step 594 performs the function of computing constants 112 in method 100 of FIG. 1. The final step 594 functions as a part of the computing and reporting of response times step 107, in method 100 and may be continuously utilized within step 107 by importing results from network population predictions from step 106.

The graph of the equation in step 594 is a curve representing sets of estimated network response times with respect to the relative load and a single configuration useful for performing scalability predictions for the network and for making adjustments to the network as it grows.

Figure 6:
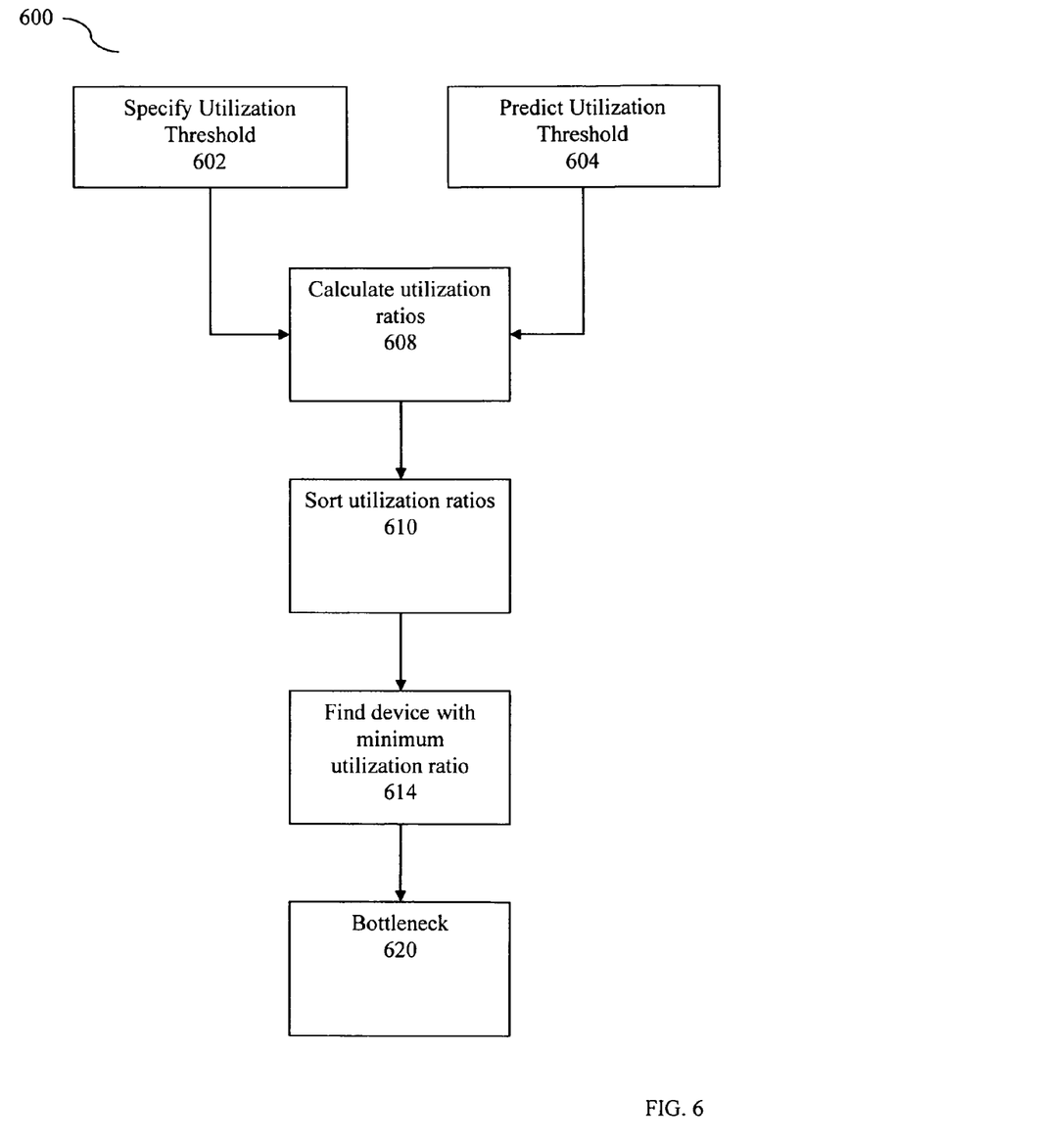
FIG. 6 is a diagram illustrating an exemplary method of predicting bottlenecks in the preferred embodiment of the present invention.

Turning to FIG. 6, illustrated is a method 600 for identifying bottlenecks. The method of FIG. 6 includes the options of either the step 602 of specifying or the step 604 of using a default utilization threshold for a device 'd'. The value of the utilization threshold of a device 'd' is represented by $\Theta_d$. A user may specify the value of $\Theta_d$ or, in default, a preset value will be assumed for $\Theta_d$. The user-specified value will typically be a value above which the user a) knows the corresponding device functions poorly or b) wants to be warned. The preset utilization will typically be 100% (fully utilized) or a value above which devices of the corresponding device type (e.g., CPUs, disks, or network interface cards) are known to be ineffective. In the preferred embodiment of the present invention, the default preset utilization is 100%: $\Theta_d=1$.

The core of method 600 includes step 608 of calculating utilization ratios, then step 610 of sorting the utilization ratios and then step 614 of selecting the device with the minimum utilization ratio. A device identified as the bottleneck in the given network configuration is reported in step 620. The steps combine to carry out a process to find a device "m" that minimizes the utilization ratio:

$$x_d=\Theta_d/\rho_d(1,c),$$

where $\Theta_d$ is the selected or default utilization threshold for a device 'd' and $\rho_d(1,c)$ is the utilization for device 'd' at the base load for a given configuration 'c'.

In step 608 of method 600, the utilization ratios '$x_d$' are calculated for all devices 'd' in the configuration 'c' of the network and stored in computer memory for further operations.

In step 610 of method 600, the devices 'd' in the network are sorted and displayed in order of their utilization ratios '$x_d$' from smallest to largest.

In step 614 of method 600, the device 'm' that has the smallest value '$x_m$' among the utilization ratios '$x_d$' is selected as the first device in the sorted list created in step 610. While device 'm' is the bottleneck for the current network configuration 'c', it may be of interest to report the top 'b' candidates for bottlenecks in the network configuration 'c'. Step 614 may be programmed to report the top 'b' candidates for bottlenecks by examining the top 'b' items in the sorted list from step 610.

By setting the relative load $x=\Theta_d/\rho_d(1,c)$ in the equation for the device utilizations $\rho_d(x,c)$, it is shown that $$\rho_d(x,c)=x\cdot\rho_d(1,c)=\Theta_d.$$

According to this result, each device 'd' reaches its utilization threshold at relative load $x=x_d=\Theta_d/\rho_d(1,c)$, Since device 'm' minimizes the utilization ratio equal to '$x_d$', device 'm' reaches its threshold at the lowest relative load 'x' so that device 'm' is identified as the bottleneck device.

The output of method 600 is to identify device 'm' as the bottleneck device in the network, reporting the identified bottleneck information 620 to a user process or software process to evaluate the upgrading of bottleneck devices. In other embodiments, report information 620 may be programmed to indicate the top 'b' bottlenecks in the network configuration 'c'. In the preferred embodiment of the present invention, the identified bottleneck information from step 620 is used to change the network configuration in step 110 of method 100 and the entire method 600 may be used recursively as the devices are replaced.

In a real world system, CPU utilization will typically increase more rapidly than the rate of arrival of jobs to the network. This is due to the underlying operating system having to switch among more and more tasks and applications as the network utilization grows. It is also useful as part of the present invention to approximate the overhead of CPU utilization required by the operating system.

Figure 7:
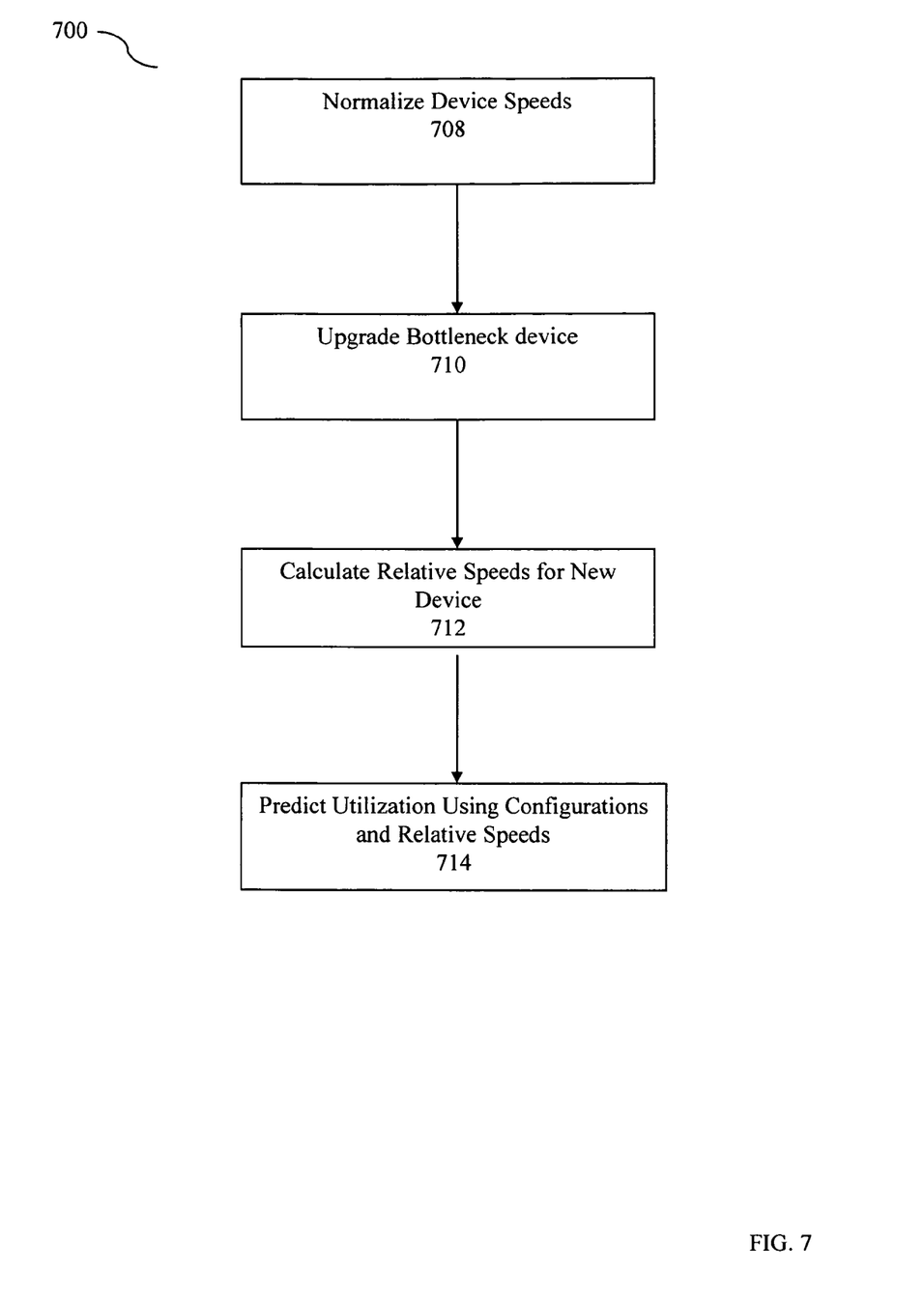
FIG. 7 is a diagram illustrating an exemplary method of upgrading the capacity on a network and recalculating network usage data associated with said capacity upgrade in the preferred embodiment of the present invention.

Once the bottleneck device has been identified, the method 700 for changing the network configuration is performed as shown in FIG. 7, comprising step 708 to normalize the device speeds in the network usage data, step 710 of upgrading the bottleneck device to one with higher speed, step 712 of calculating a relative speed for the new device and step 714 of predicting the new device utilization using the configuration information and the relative speed from step 712. In other embodiments of the present invention, the relative speed calculation can be done before or after the bottleneck device has been upgraded or replaced. In the preferred embodiment, step 712 of calculating relative speeds for the new device follows step 710 in order.

In the first step 708 of method 700 in the preferred embodiment of the present invention, the device speeds are normalized. The benchmark (e.g., SPEC or TPC) ratings or actual speed tests of both the bottleneck device and the replacement device must be known and recorded prior to the normalization. The benchmark ratings are typically obtained from the manufacturer of the device or from independent third party benchmark organizations such as the Standard Performance Evaluation Corporation (SPEC) or the Transaction Processing Performance Council (TPC). The device speeds, $b_d(c=1)$ are normalized to 1 for all possible devices in the current network configuration 'c=1' prior to changing the configuration. Other embodiments may employ a different normalization for the current device speeds.

To upgrade the bottleneck device in step 710, the network engineer replaces with a higher speed device the identified bottleneck device 'm' reported from method 600 via report information 620. In other embodiments, a plurality of devices may be replaced based on report information 620 reporting the top 'b' bottlenecks and the methods that follow may be repeated for each replaced device.

To calculate the relative device speed in step 712, $b_m(c)$ is assigned to be the speed of device 'm' in configuration 'c' relative to the speed of device 'm' in the prior configuration '1'. To illustrate, suppose the reported bottleneck device 'm' has a given benchmark rating of 200 and is replaced by a device with a given benchmark rating of 600. Here:

$$b_m(c=2)=600/200=3.$$

The new device 'm' in configuration '2' is three times faster relative to the speed of the original device 'm' in configuration '1'.

Using the relative device speeds and the new configuration, the method 700 includes the step 714 of predicting utilization. Predicting utilization step 714 is accomplished by recalculating the device utilizations according to:

$$\rho_d(x, c) = x * \rho_d(1,1)/b_d(c)$$

where $\rho_d(x, c)$ is the utilization of device 'd' at relative load 'x' in a new configuration 'c'. $\rho_d(1,1)$ is the utilization of the device 'd' prior to replacement and in the original configuration '1'. Other useful statistics are also recalculated at this time for the network configuration 'c' such as $N_d(x, c)$ and $N_0(x, c)$ according to the methodologies described previously. Note that the device utilization at the base load 'x=1' has been inherently recalculated according to step 714, since $$\rho_d(1, c) = \rho_d(1,1)/b_d(c).$$

The method 700 described herein may be performed at any time, not only at times when a device in the configuration reaches a bottleneck. The method 700 can also be implemented to analyze and replace multiple devices concurrently.

For the purposes of the present invention, clusters of servers may be treated as one or multiple devices compatible with the methods described above. Also, a server with multiple CPUs is typically treated as part of one M/M/1 queue. The present invention is also applicable to multiple CPU servers treated as multiple M/M/1 queues.

It should be emphasized that the above-described systems and methods of the present invention, particularly, any exemplary embodiments, are merely possible examples of implementations and are merely set forth for providing a clearing understanding of the principles of the invention. The descriptions in this specification are for purposes of illustration only and are not to be construed in a limiting sense. Many variations will be apparent to persons skilled in the art upon reference to the description and may be made to the above-described embodiments of the invention without departing substantially from the spirit and principles of the invention. All such modifications and variations are intended to be included herein within the scope of this disclosure and the present invention and protected by the following claims.

The invention claimed is:

1. A method for performing network capacity planning on a network having a set of network devices in a base network configuration operating at a base load and having a set of measured network device usage data available for the base load, comprising the steps of:
   receiving a set of measured device utilizations for a subset of network devices in the set of network devices;
   identifying a subset of busiest network devices from the subset of network devices; and
   estimating a base load network population $N_0(1)$ at the base load and a relative load network population $N_0(x)$ at a relative load from the set of measured device utilizations, where the relative load value x is the ratio of the relative load to the base load;
   calculating a relative response time $R(x)$ at the relative load based on a network population ratio: $N_0(x)/N_0(1)$; and,
   replacing a subset of network devices from the set of network devices with a set of new network devices to form an upgraded network configuration based on the relative response time $R(x)$.

2. The method of claim 1 wherein the step of identifying a subset of busiest network devices from the set of network devices comprises the additional step of selecting network devices with the largest device utilizations in the set of measured device utilizations.

3. The method of claim 1 further comprising the step of verifying the accuracy of the network population ratio.

4. The method of claim 1 comprising the additional step of receiving the set of measured network device usage data including a first absolute response time $A(1)$ measured at the base load.

5. The method of claim 4 wherein calculating the relative response time $R(x)$ for the relative load includes the steps:
   normalizing the relative response time $R(1)$ measured at the base load to a constant value;
   calculating the relative response time $R(x)$ at the relative load according to the formula:

$$R(x)=(N_0(x)/N_0(1))/x.$$

6. The method of claim 5 including the step of calculating a second absolute response time $A(x)$ for the relative load according to:

$$A(x)=A(1) \times R(x).$$

7. The method of claim 5 wherein the constant value is set equal to one in the step of normalizing the relative response time $R(1)$.

8. The method of claim 4 wherein the step of calculating the relative response time at the relative load includes the steps of:
   receiving a measured set of response times for a set of observed relative load values;
   fitting the measured set of response times to a functional form having relative load value as the dependent variable;
   characterizing a fit to the functional form by a set of constants;
   storing the set of constants in a computer memory;
   utilizing the functional form and the set of constants to predict the relative response time at a new set of relative load values.

9. The method of claim 8 wherein the functional form is $$R(x)=a_0+a_1 x+a_2(N_0(x)/N_0(1))/x$$

and $a_0$, $a_1$, and $a_2$ are the set of constants characterizing the fit.

10. The method of claim 1 including the steps:
    receiving a measured device utilization at the base load;
    calculating a network arrival rate from the measured device utilization;
    calculating device utilization at a relative load value x; and
    calculating relative load network population at a relative load value x.

11. The method of claim 10 wherein the step of receiving a measured device utilization at a base load includes receiving the set of measured network device usage data from a system performance monitor.

12. The method of claim 10 wherein the step of calculating a network arrival rate from the measured device utilization at a base load includes the step of setting the network arrival rate to a preset value.

13. The method of claim 10 including the step of calculating a response time at a relative load value.

14. A method for performing network capacity planning on a network having a set of network devices in a base network configuration operating at a base load and having a set of measured network device usage data available for the base load, comprising the steps of:
- receiving a set of measured device utilizations for a subset of network devices in the set of network devices;
- identifying a subset of busiest network devices from the subset of network devices; and
- estimating a base load network population $N_0(1)$ at the base load and a relative load network population $N_0(x)$ at a relative load from the set of measured device utilizations, where the relative load value x is the ratio of the relative load to the base load; and,
- normalizing a set of stored network device speeds associated with the set of network devices to a constant value;
- replacing a subset of network devices from the set of network devices with a set of new network devices to form an upgraded network configuration c;
- calculating a set of relative device speeds $b_d(c)$ for each new device d in the set of new network devices; and,
- predicting a set of network device utilizations in the upgraded network configuration for at least one relative load different than the base load.

15. The method of claim 14 in which the step of replacing the subset of network devices is performed based on the calculated set of relative device speeds for the new network devices.

16. The method of claim 14 in which the step of replacing the subset of network devices is performed before the step of normalizing the set of stored network device speeds.

17. The method of claim 14 wherein the step of predicting the set of network device utilizations in the upgraded network configuration includes calculating at least one device utilization at the base load.

18. The method of claim 14 wherein the step of calculating the set of relative device speeds $b_d(c)$ includes forming a ratio of a first benchmark rating for a new device d in the upgraded network configuration to a second benchmark rating for the replaced device d in the base network.

19. The method of claim 18 wherein the step of predicting the set of network device utilizations is performed by calculating a new device utilization for at least one new network device, corresponding to a replaced network device d from the base network configuration, according to:

$$\rho_d(x, c) = x \cdot \rho_d(1, 1)/b_d(c),$$

wherein $\rho_d(1, 1)$ is the device utilization for the replaced network device in the base network configuration operating at the base load and $\rho_d(x, c)$ is the new device utilization in the upgraded network configuration c operating at the relative load value x.

20. The method of claim 1 wherein the step of calculating the base load network population and the relative load network population is performed according to the formula:

$$N_0(x) = \rho_d(x)/[1 - \rho_d(x)],$$

where $\rho_d(x)$ is a relative device utilization at the relative load value x for a device d.

21. The method of claim 20 including the step of calculating the relative device utilization $\rho_d(x)$ from a measured device utilization at the base load, $\rho_d(1)$, according to the formula:

$$\rho_d(x) = x \times \rho_d(1).$$

* * * * *